United States Patent
Chattopadhyay et al.

(10) Patent No.: US 7,083,748 B2
(45) Date of Patent: *Aug. 1, 2006

(54) METHOD AND APPARATUS FOR CONTINUOUS PARTICLE PRODUCTION USING SUPERCRITICAL FLUID

(75) Inventors: Pratibhash Chattopadhyay, North Royalton, OH (US); Boris Y. Shekunov, Aurora, OH (US); Jeffrey S. Seitzinger, Broadview Heights, OH (US)

(73) Assignee: Ferro Corporation, Cleveland, OH (US)

(*) Notice: Subject to any disclaimer, the term of this patent is extended or adjusted under 35 U.S.C. 154(b) by 256 days.

This patent is subject to a terminal disclaimer.

(21) Appl. No.: 10/434,426

(22) Filed: May 8, 2003

(65) Prior Publication Data

US 2004/0156911 A1   Aug. 12, 2004

Related U.S. Application Data

(60) Provisional application No. 60/445,944, filed on Feb. 7, 2003.

(51) Int. Cl.
  *B29B 9/00* (2006.01)
  *A61K 9/00* (2006.01)
  *A61K 47/00* (2006.01)
  *A61K 9/16* (2006.01)
  *B01F 3/08* (2006.01)

(52) U.S. Cl. .................. 264/14; 516/53; 424/439; 424/489; 424/497; 424/405; 424/401; 424/400

(58) Field of Classification Search ............. 424/489; 264/14

See application file for complete search history.

(56) References Cited

U.S. PATENT DOCUMENTS

| | | | |
|---|---|---|---|
| 4,177,177 A | 12/1979 | Vanderhoff et al. | |
| 4,582,731 A | 4/1986 | Smith | |
| 4,734,451 A | 3/1988 | Smith | |
| 4,744,926 A | 5/1988 | Rice | |
| 4,898,673 A | 2/1990 | Rice et al. | |
| 5,011,819 A | 4/1991 | Leibovitz | |
| 5,043,280 A | 8/1991 | Fischer et al. | |
| 5,158,704 A | 10/1992 | Fulton et al. | |
| 5,189,107 A | 2/1993 | Kasai et al. | |
| 5,216,065 A | 6/1993 | Colyer et al. | |
| 5,244,768 A | 9/1993 | Inaba | |
| 5,266,205 A | 11/1993 | Fulton et al. | |
| 5,296,166 A | 3/1994 | Leong | |
| 5,360,478 A | 11/1994 | Krukonis et al. | |
| 5,389,263 A | 2/1995 | Gallagher et al. | |
| 5,399,597 A | 3/1995 | Mandel et al. | |
| 5,440,055 A * | 8/1995 | Castor ............... | 549/510 |
| 5,494,683 A | 2/1996 | Liversidge et al. | |
| 5,548,004 A | 8/1996 | Mandel et al. | |
| 5,554,382 A | 9/1996 | Castor | |
| 5,578,650 A | 11/1996 | Delgado et al. | |
| 5,622,649 A | 4/1997 | Hunter et al. | |
| 5,639,441 A | 6/1997 | Sievers et al. | |
| 5,674,911 A | 10/1997 | Emanuele et al. | |
| 5,691,387 A | 11/1997 | Emanuele et al. | |
| 5,696,298 A | 12/1997 | Emanuele et al. | |
| 5,707,634 A | 1/1998 | Schmitt | |
| 5,707,673 A | 1/1998 | Prevost et al. | |
| 5,727,333 A | 3/1998 | Folan | |
| 5,750,679 A | 5/1998 | Haas et al. | |
| 5,750,709 A | 5/1998 | Castor | |
| 5,766,636 A | 6/1998 | Turk et al. | |
| 5,766,637 A | 6/1998 | Shine et al. ............ | 424/497 |
| 5,770,559 A | 6/1998 | Manning et al. | |
| 5,776,486 A | 7/1998 | Castor et al. | |
| 5,789,505 A | 8/1998 | Wilkinson et al. | |
| 5,827,522 A | 10/1998 | Nowak | |
| 5,863,696 A | 1/1999 | Koyama et al. | |
| 5,874,029 A | 2/1999 | Subramaniam et al. | |
| 5,921,478 A | 7/1999 | Kamiwano et al. | |

(Continued)

FOREIGN PATENT DOCUMENTS

JP    01-158042    6/1989

(Continued)

OTHER PUBLICATIONS

Sjostrom, Brita and Bergenstahl, Bjorn. Preparation of submicron drug particles in lecithin-stabilized o/w emulsions; I. Model studies of the precipitation of cholesteryl acetate, International Journal of Pharmaceutics 88 53-62 (1992) Elsevier Science Publishers B.V.

(Continued)

*Primary Examiner*—Michael G. Hartley
*Assistant Examiner*—Jake Vu
(74) *Attorney, Agent, or Firm*—Rankin, Hill, Porter & Clark LLP

(57) ABSTRACT

A method and an apparatus for continuously producing particles from an emulsion by supercritical fluid extraction. The emulsion includes a solute suspended or dissolved in the supercritical fluid soluble first phase. The supercritical fluid and the emulsion contact each other such that the first phase dissolves from the emulsion into the supercritical fluid and the solute precipitates to form a suspension in a non supercritical fluid soluble second phase of the emulsion. The supercritical fluid carries away the dissolved first phase. The solvent bearing supercritical fluid, together with the solute suspended in the second phase, is removed from an extraction chamber at a rate that is about the same as a rate that the emulsion and the supercritical fluid flow into the extraction chamber. Thus, a constant mass and pressure is maintained in the extraction chamber and the particles are produced continuously.

18 Claims, 14 Drawing Sheets

U.S. PATENT DOCUMENTS

| | | |
|---|---|---|
| 5,981,474 A | 11/1999 | Manning et al. |
| 5,990,241 A | 11/1999 | Emanuele et al. |
| 5,993,747 A | 11/1999 | Mandel |
| 5,993,850 A | 11/1999 | Sankaram et al. |
| RE36,665 E | 4/2000 | Emanuele et al. |
| 6,087,003 A | 7/2000 | Benoit et al. |
| 6,095,134 A * | 8/2000 | Sievers et al. ......... 128/200.14 |
| 6,106,720 A | 8/2000 | Kanel et al. |
| 6,214,384 B1 | 4/2001 | Pallado et al. |
| 6,228,399 B1 | 5/2001 | Parikh et al. |
| 6,235,701 B1 | 5/2001 | Senger Elsbernd et al. |
| 6,248,363 B1 | 6/2001 | Patel et al. |
| RE37,285 E | 7/2001 | Emanuele et al. |
| 6,291,013 B1 | 9/2001 | Gibson et al. |
| 6,299,906 B1 | 10/2001 | Bausch et al. |
| 6,359,014 B1 | 3/2002 | Emanuele et al. |
| 6,372,260 B1 | 4/2002 | Andersson et al. |
| 6,380,302 B1 | 4/2002 | Ikenaga et al. |
| 6,384,090 B1 | 5/2002 | Riede et al. |
| 6,391,452 B1 | 5/2002 | Antonsen et al. |
| 6,414,050 B1 | 7/2002 | Howdle et al. |
| 6,416,742 B1 | 7/2002 | Stefely et al. |
| 6,440,431 B1 | 8/2002 | Yoshida et al. |
| 6,440,493 B1 | 8/2002 | Gibson et al. |
| 6,479,584 B1 | 11/2002 | Nakagawa et al. |
| 6,540,393 B1 | 4/2003 | Lyons et al. |

FOREIGN PATENT DOCUMENTS

| | | | |
|---|---|---|---|
| WO | WO-9501221 | * | 1/1995 |
| WO | WO 03/000192 A2 | | 1/2003 |

OTHER PUBLICATIONS

Sjostrom, Brita and Bergenstahl, Bjorn. Preparation of submicron drug particles in lecithin-stabilized o/w emulsions; I. Model studies of the precipitation of cholesteryl acetate, International Journal of Pharmaceutics 84, 107-116 (1992) Elsevier Science Publishers B.V.

Nakajima, Akira; Hashimoto, Kazuhito; and Watanabe, Toshiya. Recent Studies on Super-Hydrophobic Films, Monatshefte fur Chemie 132, 31-41 (2001). Austria.

Chung, Tze-Wen; Huang, Yi-You; and Liu Yi-Ze. Effects of the rate of solvent evaporation on the characteristics of drug loaded PLLA and PDLLA microspheres, International Journal of Pharmaceutics 212 161-169 (2001).

* cited by examiner

METHOD AND APPARATUS FOR CONTINUOUS PARTICLE PRODUCTION USING SUPERCRITICAL FLUID

REFERENCE TO RELATED APPLICATIONS

This application claims priority to provisional patent Application Ser. No. 60/445,944, filed Feb. 7, 2003, the disclosure of which is hereby incorporated by reference in its entirety.

FIELD OF INVENTION

The present invention relates generally to an apparatus and method of producing nano and micro scale particles via supercritical fluid processing.

DESCRIPTION OF RELATED ART

Several processing techniques utilize the enhanced mass-transfer properties and benign nature of supercritical or near-critical fluid or compressed gas (collectively "supercritical fluid") for manufacturing composite or single-material particles. Conventional methods include the following techniques: Rapid Expansion of Supercritical Solution (RESS), Particles from Gas-Saturated Solutions (PGSS), Supercritical Anti-Solvent (SAS), Gas Antisolvent (GAS) and Aerosol Solvent Extraction System (ASES).

RESS involves precipitation of particulate material by expansion of solution of this material in supercritical fluid and therefore, its applications are limited to the compounds which have a significant solubility in the supercritical fluid (typically higher than $10^{-4}$ mole fraction).

PGSS involves the plasticizing or melting of a solid with a supercritical fluid, and a subsequent expansion into a collection vessel. The supercritical fluid must be able to melt or lower the viscosity of the solid material to be precipitated.

SAS is a continuous or a batch process depending on the mode of operation. In this process, the solution containing the solute of interest is injected into a vessel containing a supercritical fluid. Extraction of the solvent from the injected solution by the supercritical fluid leads to precipitation of the solute as particles.

GAS (Gas Anti-Solvent), is a batch process where the supercritical fluid anti-solvent is injected into a solution containing the solute to be precipitated. GAS is analogous to evaporative crystallization in some circumstances. The supercritical fluid extracts the solvent out of the solution, which causes the solid to precipitate as particles.

ASES is a continuous process for precipitating particles. The solution of interest is injected via nozzle into a supercritical fluid stream. The supercritical fluid stream is co-injected, for example, a coaxial nozzle arrangement is used so that the inner nozzle injects the solution, and the outer nozzle injects the supercritical fluid. Alternatively, a single nozzle can be used to inject both the supercritical fluid and the solvent. Such a system is described in U.S. Pat. No. 6,372,260, which is hereby incorporated by reference in its entirety.

Unfortunately, the techniques mentioned above exhibit poor particle size control and uniformity. This fundamental limitation is caused by the corresponding precipitation mechanisms. The competition between nucleation and growth phenomena creates a limitation on a mean particle diameter for each of the above conventional processes. Accordingly, it is difficult to obtain low micron to nano-sized particles for most materials, and such particles generally have an undesirably broad particle size distribution.

In addition, precipitation mechanisms in conventional supercritical fluid processes can result in particle agglomeration between growing particles (e.g., via bridge formation), and can further result in the separation of differing materials in the solid phase. This separation phenomenon prevents controlled production of homogeneous composite particles, and results in undesirable heterogeneous particles. For example, homogeneous composite polymer/drug microspheres and uniform coated particles are particularly difficult to produce using conventional RESS, PGSS, SAS and ASES processes.

A drawback specific to the conventional SAS technique is the plasticization and aggregation of glassy or semi-crystalline materials in the supercritical fluid. Such plasticization and aggregation can result in strong particle agglomeration and inconsistent particle coating.

Particles have been produced from emulsions, and conventional methods include emulsion polymerization, emulsion evaporation and liquid solvent extraction of an emulsion. Unfortunately, practicing conventional emulsion particle formation methods can require a choice between two undesirable situations. First, there can be an undesirable level of residual solvent in the resultant particles, and second ensuring a low residual solvent level can take an undesirably long time. Also, surface evaporation or liquid extraction techniques have inefficient mass-transfer mechanisms, which can result in inconsistency of particle size distribution and undesirable solid-state properties of the particles.

In addition, conventional liquid extraction of emulsion processes can be difficult to scale up, and the processes can require the use of a large amount of solvent, which can result in an undesirably large waste stream. Concerns have also been raised in recent years about possible environmental and health affects arising from the use of certain solvents that are difficult to remove completely and are sometimes retained as a residual material in the final product.

A particle production technique having benefits of both emulsion processing methods and supercritical processing methods, while allowing a continuous production of single-component or composite particles, would be desirable. Further, it would be advantageous to produce particles having a narrowly controlled size range, a controlled distribution of the excipient/active materials (coating or encapsulation), flexibility with reference to the manipulation of the particle solid-state properties, and enhanced purity.

SUMMARY OF THE INVENTION

The present invention provides a method of producing particles using a supercritical fluid processing technique in a continuous, rather than batch process, manner. The present invention also provides an apparatus for implementing the method according to the invention. Generally, solute particles are produced in accordance with the current invention via supercritical fluid extraction of solvent from a solution in a discontinuous phase of an emulsion, where the solution has a solute that is dissolved therein. The solute precipitates as particles suspended in a continuous phase of the emulsion.

A method in accordance with the present invention continuously produces particles from the emulsion. As with most emulsions, the emulsion has a continuous phase and a discontinuous phase. The continuous phase is selected to be generally insoluble in supercritical fluid, and the discontinuous phase includes a solvent that is generally soluble in the supercritical fluid. The discontinuous phase is preferably a solution that is generally insoluble in the continuous phase. The solution includes the solvent and a solute dissolved in the solvent. The solute is generally insoluble in the supercritical fluid.

The emulsion flows into an extraction chamber, and simultaneously the supercritical fluid flows into an extraction chamber. The supercritical fluid contacts the emulsion in the extraction chamber such that the discontinuous phase dissolves from the emulsion into the supercritical fluid. The solvent bearing supercritical fluid is a supercritical fluid mixture. Dissolution of the solvent from the emulsion to the supercritical fluid causes the solute, which had been dissolved in the solvent, to supersaturate and precipitate as particles that are suspended in the continuous phase to form a liquid suspension. The supercritical fluid mixture and the liquid suspension are removed from the extraction chamber at a rate such that an amount of supercritical fluid mixture and the liquid suspension flowing out from the extraction chamber is about the same as an amount of emulsion and supercritical fluid flowing into the extraction chamber.

The apparatus for continuously producing particles in accordance with the present invention includes an extraction vessel having an inner surface defining the extraction chamber. A supercritical fluid pump supplies the supercritical fluid into the extraction chamber. An emulsion pump supplies the emulsion into the extraction chamber. A backpressure regulator removes the supercritical fluid mixture from the extraction chamber. A valve removes the liquid suspension from the extraction chamber. The supercritical fluid pump, the emulsion pump, the backpressure regulator, and the valve cooperate with each other such that the supercritical fluid and the emulsion are supplied into the extraction chamber at a rate that is about the same as the rate that the supercritical fluid mixture and liquid suspension are removed from the extraction chamber.

DESCRIPTION OF PREFERRED EMBODIMENTS

Figure 1:
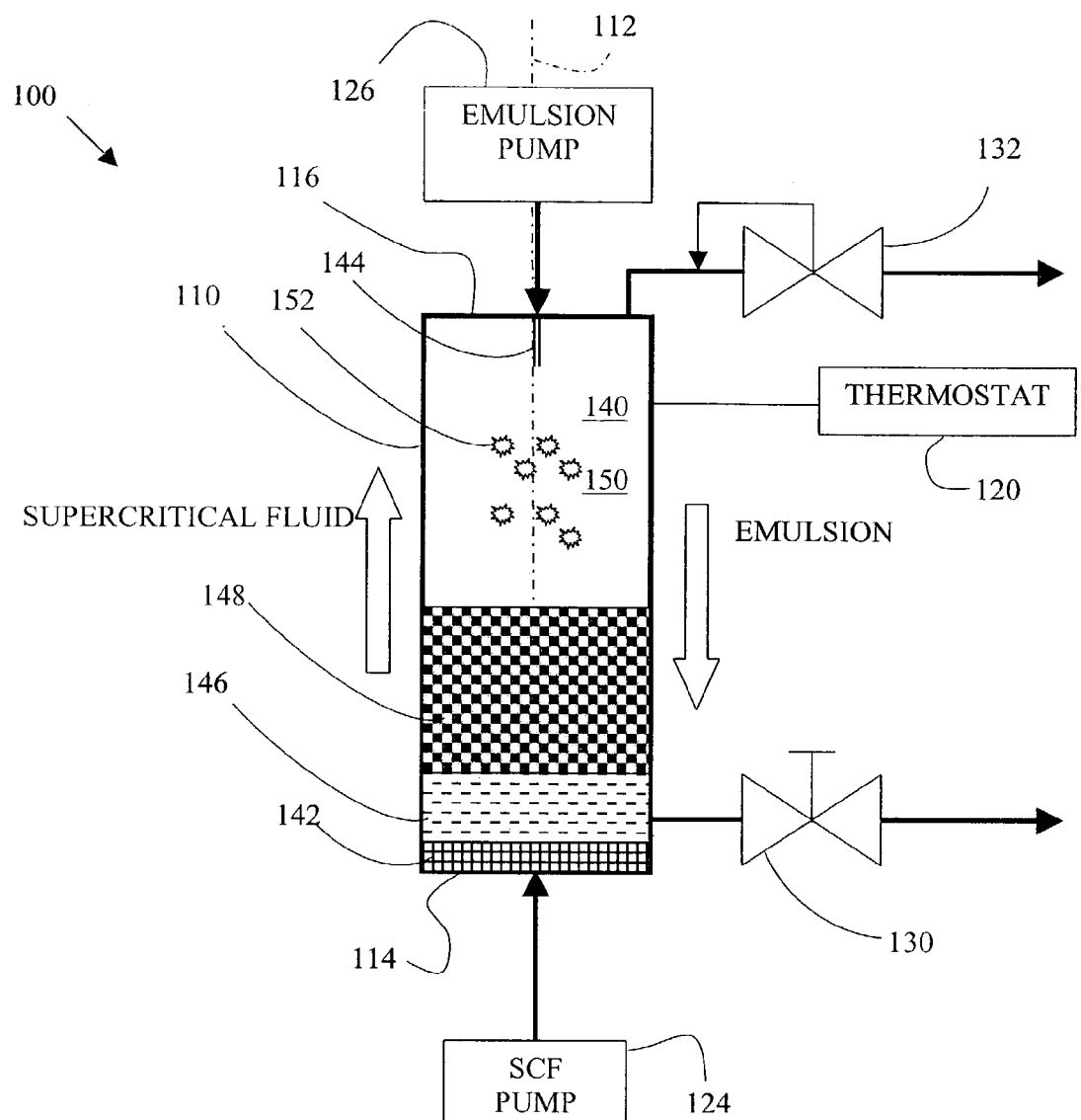
FIG. 1 is a schematic drawing of a first apparatus for use with a method according to the invention.

The present invention provides an apparatus and method for producing particles by supercritical fluid extraction of an emulsion using a continuous processing technique. An apparatus 100 for implementing a first or "contra-current" method according to the invention is shown in FIG. 1.

The apparatus 100 includes a reactor or extractor 110, preferably a closed cylinder, defining an axis 112 and having first and second ends 114, 116 that are spaced axially apart from each other. The axis 112 is preferably oriented vertically such that the first end 114 is below the second end 116. That is, the second end 116 is UP and the first end 114 is DOWN when moving along the axis 112. The extractor 110 is preferably about 1 to about 5 meters long, however other lengths and configurations can be employed.

A thermostat 120 communicates with heating elements (not shown) that are located proximate to the extractor 110. A supercritical fluid pump 124 communicates with the first end 114 of the extractor 110, and an emulsion pump 126 communicates with the second end 116 of the extractor 110. A valve 130 and a backpressure regulator 132 also communicate with the extractor 110.

The extractor 110 has an inner surface that defines an extraction chamber 140. Preferably, disposed within the extraction chamber 140 are optional parts. The parts include, for example, a frit 142, a nozzle 144, and a packed bed 148. An upper portion or headspace 150 is defined by the portion of the chamber 140 that is not occupied by the packed bed 148, if such is present.

The supercritical fluid pump 124 is preferably a P-200 high-pressure reciprocating pump commercially available from Thar Technologies, Inc. (Pittsburgh, Pa.). Suitable alternative pumps include diaphragm pumps and air-actuated pumps that provide a continuous flow of supercritical fluid. Preferably, the supercritical fluid pump 124 can be supplemented with a surge tank and metering valve (not shown) so as produce a pulse-free flow.

The frit 142 is preferably stainless steel and has a pore size of preferably about 0.5 micrometer ($\mu$m) or smaller. The frit 142 overlays the inner surface of the extractor 110 at the extractor first end 114. The supercritical fluid pump 124 is in fluid communication with the frit 142 and supplies supercritical fluid through the frit 142 into the extraction chamber 140. The frit 142 is preferably micro-porous. Supercritical fluid flowing through the frit 142 breaks into a plurality of dispersed flow streams, thus increasing the contact or surface area of the supercritical fluid.

The emulsion pump 126 is preferably a high-pressure liquid chromatography (HPLC) reciprocating pump such as model PU-2080, which is commercially available from Jasco Inc. (Easton, Md.). Suitable alternative pumps include syringe type pumps, such as the 1000D or 260D pumps, which are commercially available from Isco Inc. (Lincoln, Nebr.).

The nozzle 144 is preferably a capillary-type nozzle and extends inward from the inner surface of the extractor 110 at the second end 116 into the extraction chamber 140. The emulsion pump 126 is in fluid communication with the nozzle 144 and supplies an emulsion (discussed in further detail hereinbelow) through the nozzle 144 into the extraction chamber 140. A head of the nozzle 144 can have a single opening, or preferably is perforated to define a plurality of openings having very small diameters of uniform size. The diameter of the openings can affect droplet size of the emulsion passing therethrough. Thus, selecting the diameters of the head openings can control the size of the resultant emulsion droplets.

Alternative methods according to the invention may be employed so that rather than spraying droplets using a nozzle, the emulsion is pumped into the chamber 140 as a stream or as large droplets having a relatively reduced surface area. If an alternative nozzle is used to pump a stream of emulsion into the chamber 140, it is preferable that the retention time or the contact area is increased by using, for example, the packed bed 148 so as to effect a sufficient contact time and surface area between the flows of supercritical fluid and emulsion.

Using the packed bed 148 can increase the extraction efficiency of an extraction column. The packed bed. 148 is preferably formed of Raschig rings, which are commercially available from Labglass, Inc. an SP Industries Company (Vineland, N.J.). In alternative embodiments, the packed bed comprises of glass beads, ceramic pellets, glass wool, catalyst, stainless steel wool, and the like. As an alternative to the use of the packed bed 148, a series of trays is disposed along a flow path of the emulsion. The trays lengthen the emulsion flow path and thus increase the contact time of the emulsion and the supercritical fluid to obtain a desired level of solvent extraction by the supercritical fluid.

The valve 130 is preferably a standard commercially available valve and is interchangeable with other like valves that are known to those of ordinary skill in the art. The backpressure regulator 132 is preferably a 26-1700 type regulator, which is commercially available from Tescom, USA (Elk River, Minn.). The valve 130 and the backpressure regulator 132 determine the flow of materials out of the extraction chamber 140.

Figure 2:
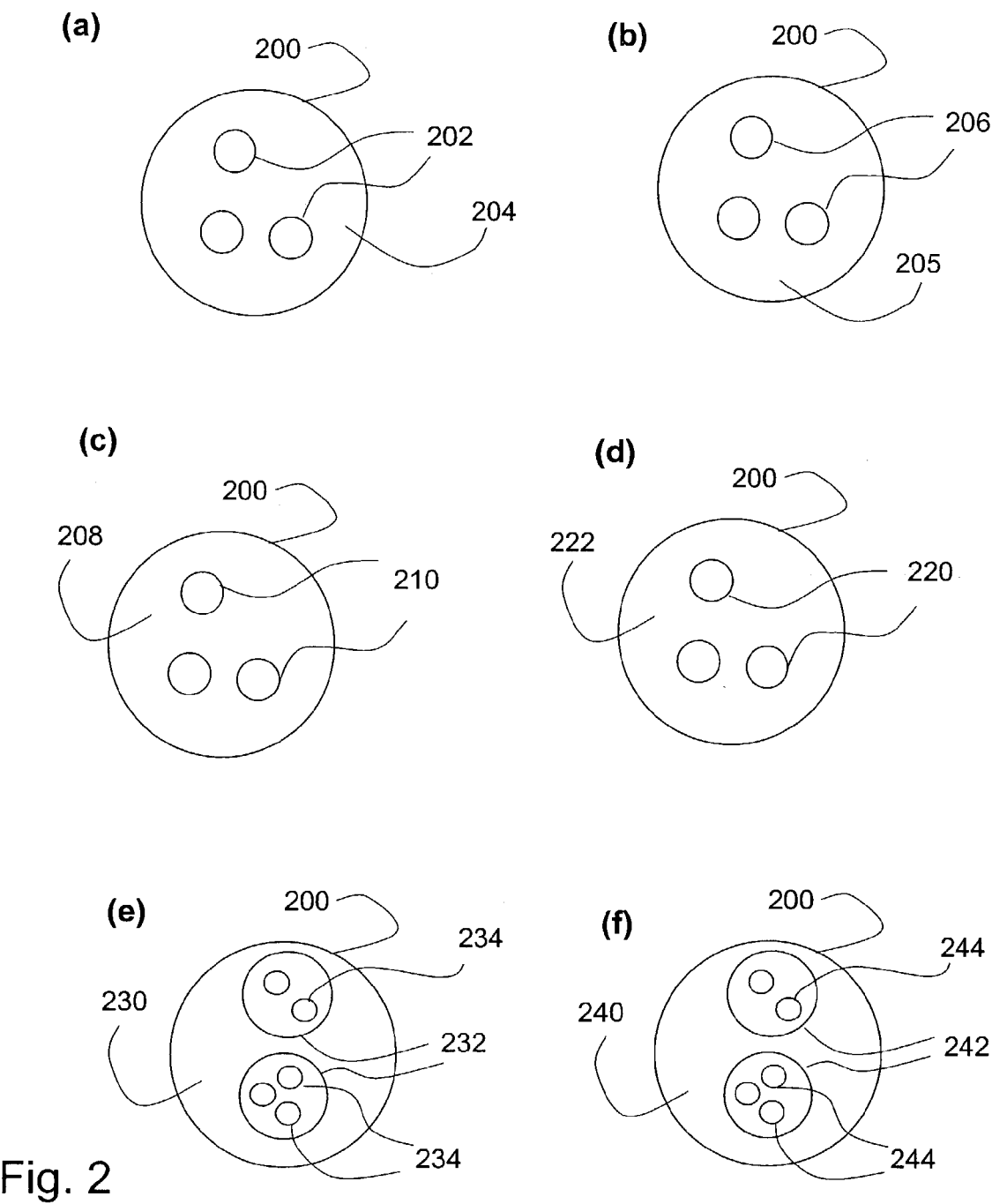
FIGS. 2(a)–(f) are schematic drawings of exemplary emulsion systems.

With reference to FIGS. 2(a)–(f) suitable emulsions include emulsions with an oil phase and an aqueous phase formed as an emulsion system 200. In FIG. 2(a), the emulsion system 200 contains an oil or solvent micelle 202 having a material or solute dissolved therein and a water phase 204. The solvent is essentially immiscible with water, thus there is no solvent in the water phase 204. Solvents that are "essentially immiscible with water" have a composition less than 1 part per 100 parts of the aqueous phase at Standard Pressure and Temperature (STP) conditions. Examples of solvents that are "essentially immiscible with water" include toluene and hexane.

In FIG. 2(b), the emulsion system 200 contains a first mixed phase 205 containing water and a solvent that is partially miscible with the water and dissolved therein. The emulsion system 200 also contains a second phase 206 having a material dissolved in the partially water miscible solvent micelle 206. Solvents that are "essentially miscible with water" include those that form a single phase upon mixing with water under STP conditions. Solvents that are neither "essentially immiscible with water" nor are "essentially miscible with water" are deemed as "partially miscible with water". Examples of a solvent such solvent include ethyl acetate (9.7 parts/100 pars water) and 2-Butanone (24 parts/100 parts water).

In FIG. 2(c), the emulsion system 200 contains two non-aqueous liquids that form an oil-in-oil (O/O) emulsion. A first oil phase 208 is dispersed within a second oil phase 210. The second oil phase 210 has a material to be precipitated dissolved therein and is immiscible in the first oil phase 208. An example of two such oils or liquids are acetone and long-chain paraffin. In case of O/O emulsions, either the oil phases or one of the oil phases containing the solute can be soluble in the supercritical fluid. When both the oil phases are soluble, dry powder of the solute is obtained as opposed to an oil suspension of the solute particles when one of the oil phases is soluble in supercritical fluid.

In FIG. 2(d), the emulsion system 200 has a water-in-oil (W/O) emulsion system. In particular, the emulsion system 200 has water droplets 220 preferably having a material dissolved therein to form an aqueous solution. The aqueous solution is dispersed in an external oil phase 222 preferably having a material dissolved therein. The oil phase is essentially immiscible or partially miscible with water.

In FIG. 2(e), the emulsion system 200 has a multiple emulsion system, such as W/O/W. Such a multiple emulsion may be based on oils that are essentially immiscible or partially miscible with water. The emulsion system 200 has an external water phase 230. Dispersed within the water phase 230 are sub-micelles 232 that are oil or solvent-based and preferably have a material dissolved or dispersed therein. Dispersed within the sub-micelles 232 are water, or a water-based dispersion 234, which preferably has a material dissolved therein.

Multiple emulsions of differing permutations are suitable for use with the invention. Alternatively, the material to be precipitated can be selected so as to be soluble only in the oil or water phase. Accordingly, the system illustrated in FIG. 2(e) can be useful for producing composite, porous or hollow particles.

In FIG. 2(f), the emulsion system 200 contains a water phase 240. Oil or solvent sub-micelles 242 are dispersed within the water phase 240. The sub-micelles 242 contain the oil or solvent. The solvent has a first material dissolved therein and a second material 244, which is insoluble in the solvent, dispersed therein. An example of the second material 244 is a colloidal solid particle. In such a system, the second material 244, which is already a solid, may act as a seed for the precipitation of the first material during processing. Accordingly, the system illustrated in FIG. 2(f) is useful for producing coated materials. Alternative permutations are also easily performed in which, for example, the first material is dissolved in the aqueous phase rather than the solvent phase, or the second material is dispersed in the aqueous phase rather than the solvent phase, or the aqueous phase is substituted with a non-miscible and non-aqueous solvent, and so forth. The specifics of the material selection are generally governed by the relative solubility of the materials used in the process and the desired product.

With further reference to FIGS. 2(a)–(f), preferably the oil or solvent—or in the case of a system with more than one oil or solvent, at least one of the oils or solvents—is essentially miscible or at least partially miscible with the supercritical fluid. That is, one of the emulsion phases is preferentially soluble in the supercritical fluid and at least one other of the phases is relatively less soluble. Accordingly, the supercritical fluid can selectively remove the preferentially soluble phase from the emulsion. Preferred solvents or oils include alcohols, toluene, ethyl acetate, methylene chloride, alkanes, alkenes, dimethyl sulfoxide (DMSO), dimethyl formamide (DMF), tetra hydrofuran (THF) and other organic solvents.

The solute is soluble in the preselected solvent, and the solvent is preferentially soluble in the supercritical fluid. Preferred solute materials include, for example, medicinal agents, sugars, biologically active materials, lipids, polymers, pigments, toxins, insecticides, viral materials, diagnostic aids, agricultural chemicals, proteins, alkyloids, peptides, animal and/or plant extracts, dyes, explosives, paints, polymer precursors, cosmetics, antigens, enzymes, catalysts, nucleic acids, antibiotics, vitamins, and combinations thereof.

If micro-encapsulates, microspheres, coated particles or co-precipitated particles are desired, a carrier or matrix material can be dissolved in the emulsion phase that is soluble in the supercritical fluid. Preferred matrix material includes polymer, filler, lipid, wax, disintegrant, binder, solubilizer, excipient, and combinations thereof. Additional matrix materials include, for example, polysaccharides, polyesters, polyethers, polyanhydrides, polyglycolides (PLGA), polylactic acid (PLA), polycaprolactone (PCL), polyethylene glycol (PEG), and polypeptides.

A surfactant, homogenizer or emulsifier (hereinafter "surfactant") can be added to stabilize emulsion according to the present invention. These surfactants include biodegradable and pharmaceutically accepted surfactants. However, emulsion systems can also be formed with very little or no surfactant to achieve short-term emulsion stability required for the duration of a supercritical fluid process according to the invention. Preferred surfactants include non-ionic, anionic and cationic surfactants. Preferred emulsifiers include poly(vinyl pyrrolidone), polyglycerol, polyricinoleate, poly(vinyl alcohol), and block copolymers.

The supercritical fluid is preferably supercritical carbon dioxide ("$CO_2$"). However, suitable alternative preferable supercritical fluids include water, trifluoro methane, nitrous oxide, dimethylether, straight chain or branched C1–C6-alkanes, alkenes, alcohols, and combinations thereof. Preferable alkanes and alcohols include ethane, ethanol, propane, propanol, butane, butanol, isopropane, isopropanol, and the like. The supercritical fluid is chosen generally with reference to the solubility of at least one of the solvents present in the emulsion.

The source of the supercritical fluid can be a virgin source or can be a recycled source. If recycled, the solvent bearing supercritical fluid is expanded to separate the solvent from the supercritical fluid. The supercritical fluid is then compressed and reused as the supercritical fluid supply or source.

During a contra-current operation of the apparatus 100, the extractor 110 is maintained at constant operating temperature by the thermostat 120. The extraction chamber 140 is brought up to a predetermined pressure, preferably by the supercritical fluid pump 124. The upper portion 150 fills with supercritical fluid.

Figure 5:
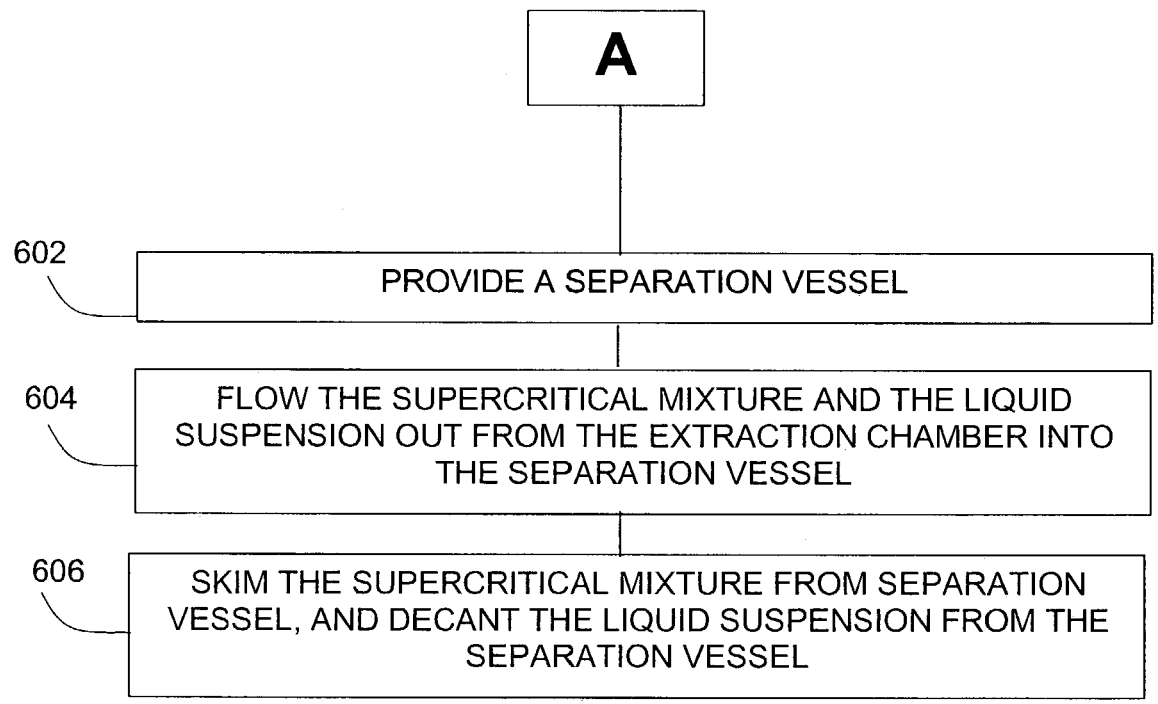
FIG. 5 is a block diagram of another method according to the invention.

With reference to FIGS. 1 and 5, the emulsion pump 126 supplies emulsion (step 502), and the supercritical fluid pump 124 supplies supercritical fluid (step 504), to the extractor 110. The supercritical fluid is dispersed upward into the extraction chamber 140 through the frit 142 at the first end 114 of the extractor 110.

Simultaneously, the emulsion is sprayed or pumped downward into the extractor 110 through the capillary nozzle 144 at the upper second end 116. In alternative embodiments, the nozzle used in the spraying process is, for example, a coaxial nozzle, an ultrasonic nozzle, or a commercially available known equivalent thereof. The supercritical fluid flows through the extraction chamber 140 by passing through the frit 142, the liquid phase 146, the packed bed 148, and the space 150 in the upward direction as indicated by the directional arrow labeled SUPERCRITICAL FLUID.

Preferably, the emulsion is sprayed or jetted into the space 150 and forms very small droplets 152 (step 502). As the emulsion jet is introduced into the extraction space 150, it is atomized into the small droplets 152 by a jet breakup caused by the passage through the openings in the nozzle 144. For essentially immiscible system, for example the system shown in FIG. 2(a), a mass transfer between the solvent contained in the emulsion droplets and supercritical fluid results in both supersaturation and precipitation of the solid within the droplets in the form of fine particles. For partially miscible systems, for example the system shown in FIG. 2(b), mass transfer may also occur between the supercritical fluid and the external liquid phase, and between the external and internal emulsion phases, also leading to solute or material precipitation.

The flow rates of both the emulsion and supercritical fluid are preferably optimized and tuned in order to provide maximum removal of the solvent from the emulsion in a minimum amount of time. The upper or maximum solid particles size is limited by the amount of solute or material dissolved within the droplets 152, that is, the concentration of the solute can affect particle size. The particle size may also be affected by factors such as concentration of the solvent, the solute and the surfactant used in the emulsion, and especially the solvent micelle size in the emulsion. The rate of solvent extraction provides control of the particle precipitation rate, and therefore influences both the number and solid-state properties (e.g. crystallinity and polymorphism) of produced particles. Composite particles can be obtained by co-precipitation of solutes or by material encapsulation a multiple emulsions system.

The droplets 152 are urged downward both by gravity, and by the momentum of the force of the emulsion through the nozzle 144. The emulsion flow is in the direction indicated by the directional arrow labeled EMULSION. The emulsion droplets 152 travel or are carried through the packed bed 148 and into the liquid phase 146. Accordingly, the droplets 152 and the supercritical fluid form contracurrent flows with the supercritical fluid flowing in a first direction and the droplets 152 flowing in an opposite second direction.

The supercritical fluid intermingles with and contacts the emulsion droplets 152 during the countercurrent current flows (step 506). The packed bed 148 increases the surface area, and thus the contact, between the emulsion and the supercritical fluid. The solvent in the emulsion droplet 152 is dissolved into the flow of supercritical fluid. The supercritical fluid thus removes the solvent from the emulsion droplet 152. The solvent removal results in the material of interest that was dissolved in the emulsion droplet 152 precipitating into the remaining phase, thus forming a particle suspension in the phase that is relatively less soluble in the supercritical fluid.

The particle suspension continues to flow downward toward, and into, the liquid phase 146. The liquid phase/suspension is collected from the extraction chamber 140 via the valve 130. The aqueous suspended particles are recovered from the purged liquid phase.

The supercritical fluid bears the dissolved solvent upward to the backpressure regulator 132. The supercritical fluid and solvent exit the extraction chamber 140 via the backpressure regulator 132. Optionally, the supercritical fluid and solvent are recovered for reuse.

Figure 4:
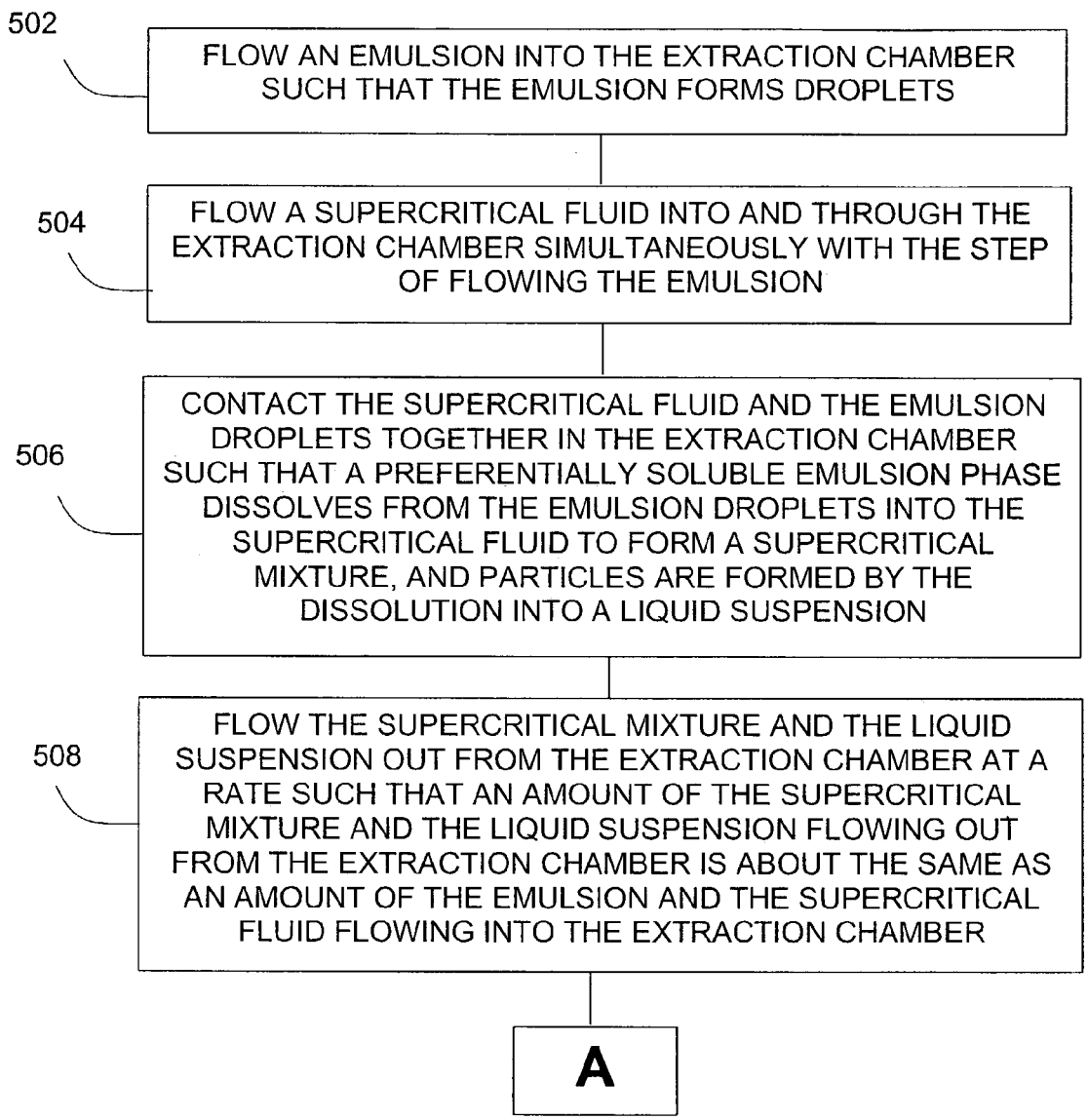
FIG. 4 is a block diagram of a method according to the invention.

The apparatus 100 operates in a continuous manner with the aid of the backpressure regulator 132 and the valve 130. The backpressure regulator 132 and the valve 130 communicate with the pumps 124, 126, and cooperate with each other to maintain the balance of feed and exit flows of the supercritical fluid and the emulsion (step 508). The method shown in FIG. 4 can end at step 508 or, alternatively, the process can continue as described hereinbelow.

Figure 3:
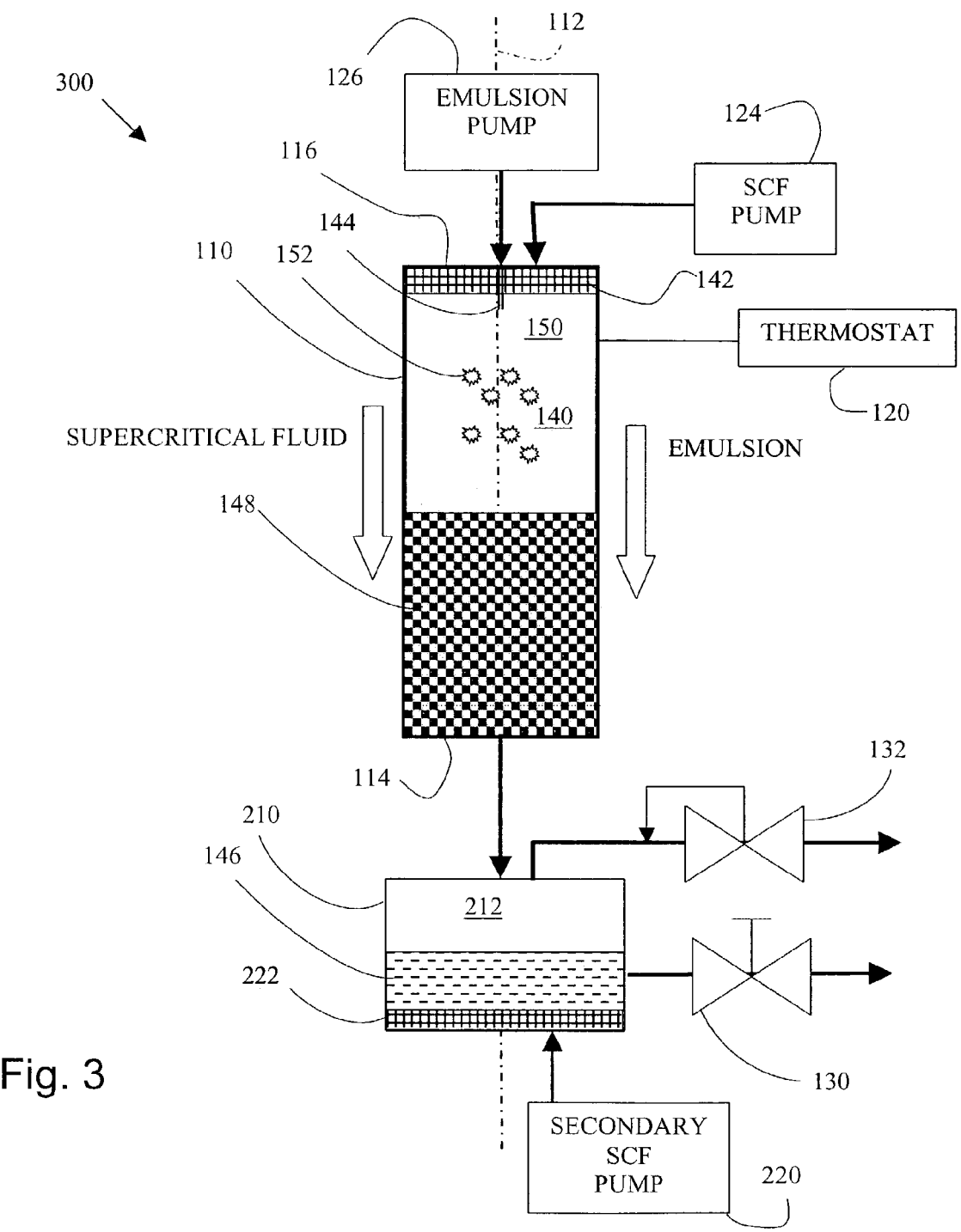
FIG. 3 is a schematic drawing of a second apparatus for use with another method according to the invention.

A second embodiment of the invention comprising an apparatus 300 for use with another method according to the invention is shown in FIG. 3. The apparatus 300 has many parts that are substantially the, same as corresponding parts of the apparatus 100; this is indicated by the use of the same reference numbers in FIGS. 1 and 3. Similar to the first embodiment, the apparatus 300 simultaneously disperses an emulsion and a supercritical fluid. However, the flows of the emulsion and the supercritical fluid are parallel or co-current in the second embodiment, rather than counter to each other. The supercritical fluid pump 124 communicates with the second end 116 of the extractor 110, rather than the first end 114, and the frit 142 overlays the second end 116 rather than the first end 114, as in the first embodiment.

The apparatus 300 includes a separation vessel 310 (step 602). The separation vessel 310 has an inner surface defining a separation chamber 312. The separation vessel 310 preferably has a cylindrical geometry.

An optional secondary supercritical fluid pump 320 supplies supercritical fluid to the vessel 310 through a secondary frit 322. The secondary frit 322 overlays a bottom portion of the inner surface of the vessel 310 inside the chamber 312.

The separation vessel 310 can also be used in conjunction with other embodiments of the invention. For example, the separation vessel 310 can be placed in fluid communication with the apparatus 100, and therefore used with a contra-current continuous flow apparatus. The addition of the separation vessel 310 to an extraction device according to the invention can facilitate easy collection of the nano-particulate suspension, increase the purity and/or reduce the residual solvent content of the resultant particles.

During operation of the apparatus 300, the thermostat 120 controls the temperature of the extractor 110 to a predetermined and equilibrated temperature. The supercritical fluid pump 124 supplies supercritical fluid to the extractor chamber 140 at the first end 116 of the extractor 110. The supercritical fluid flows through the frit 142 and downward into the chamber 140. Simultaneously, the emulsion pump 126 supplies emulsion to the extractor 110 through the nozzle 144. The emulsion flows through the nozzle 144 and downward into the chamber 140. The emulsion breaks into the droplets 152 as it exits the nozzle 144 through the nozzle opening. The droplets 152 and the supercritical fluid flow co-currently together downward through the chamber 140 and further through the packed bed 148. The co-current flow is a multi-phase flow.

The droplets 152 intimately contact the supercritical fluid during the co-current flow. Because of the contact, the solvent present in the emulsion is dissolved or extracted into the supercritical fluid. Material dissolved in the emulsion precipitates out in the form of small particles as a result of the solvent extraction.

Figure 6:
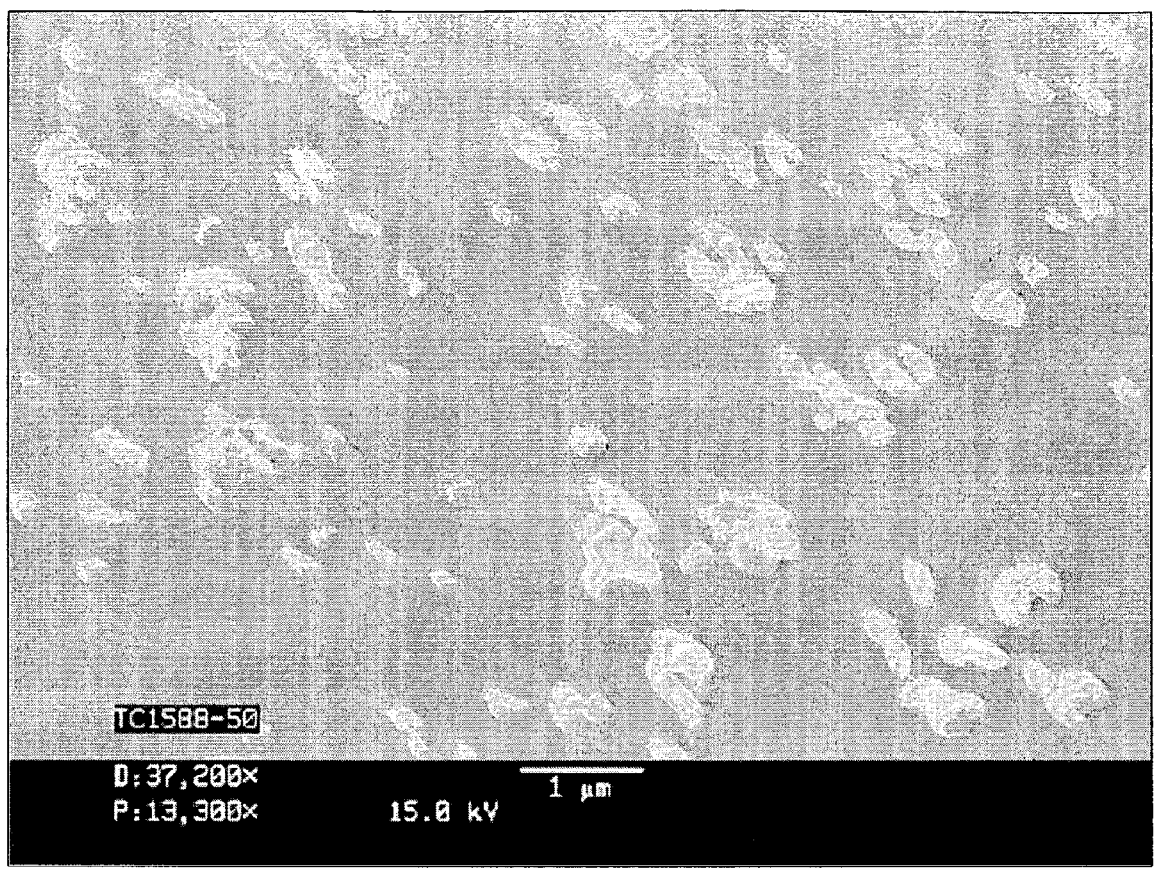
FIG. 6 is a scanning electron microscope (SEM) micrograph of PLGA particles produced in EXAMPLE 1 by a method according to the invention.

With reference to FIGS. 3 and 6, the multi-phase flow and the particles produced by the extraction process are communicated to the separation vessel 310 (step 604). The steps illustrated in FIG. 4 end with step A and the steps illustrated in FIG. 5 begin with step A to indicate that the optional additional process steps shown in FIG. 4 may be performed subsequent to or concurrent with the steps shown in FIG. 5.

In the separation vessel 310, the aqueous suspension of particles and supercritical fluid mixture (supercritical fluid+solvent) are separated (step 604). The liquid suspension is generally heavier than the supercritical fluid mixture. Thus, the separator 310 can decant the liquid suspension layer 146 and skim the supercritical fluid mixture layer (which occupies a substantial remaining portion of the chamber 312). Preferably, the separation vessel 310 has heaters (not shown) that communicate with the thermostat 120. The thermostat 120 controls the temperature in the separation vessel 310.

The secondary supercritical fluid pump 320, if present, can supply supercritical fluid into the chamber 312 through the secondary frit 322. The secondary supercritical fluid pump 320 can both control the pressure in the chamber 312, and also provide a second flow of supercritical fluid through the liquid suspension layer 146 so as to remove residual solvent and further purify the precipitated particles.

The apparatus 300 operates in a continuous manner with the aid of the backpressure regulator 132 regulating the supercritical fluid flow, and the valve 130 controlling the liquid suspension flow. The regulator 132 and valve 130 together adjusting the exit flows with reference to inflows by the pumps 124, 126.

In another aspect, a method according to the invention uses a co-solvent along with the supercritical fluid for extraction. The co-solvent can be, for example, an alcohol. While the supercritical fluid functions as described hereinabove, the co-solvent can extract the continuous phase (e.g., water) out of the emulsion. The extraction of water and the precipitation of particles caused by the extraction of solvent by the supercritical fluid/co-solvent mixture, results in the precipitation of concentrated suspensions or cakes, and sometimes even dry powders. The method of the current embodiment can be used in conjunction with, for example, either the apparatus 100 or 300 of the previously described embodiments, to form concentrated suspensions or dry powders.

In addition, the co-solvent or modifier can strip, purge or remove residual liquid from a filtered cake or concentrated suspension in a separate drying chamber or the separating vessel described hereinabove. The choice of the co-solvent is made with reference to the co-solvent being a non-solvent for the particles.

During a particular process using the co-solvent, the supercritical feed is admixed with the co-solvent. The addition of the modifier to the supercritical fluid mixture preferably increases the ability of the resultant mixture to extract the supercritical fluid insoluble second phase. For example, ethyl alcohol (which is a low molecular weight alcohol) can be admixed with carbon dioxide to facilitate extraction of water from an aqueous suspension. The supercritical feed/co-solvent mixture is introduced into an extraction chamber where the removal of both the continuous and the discontinuous phase occurs to form concentrated suspensions or in some cases dry powder. Residual solvent and the liquid that is present in the particle suspension can also be reduced by the percolation of the supercritical feed/co-solvent mixture through the particles suspension in a separate drying chamber.

In another aspect of the invention, a portion of the liquid forming the liquid suspension can be pre-removed using a separation apparatus such as a high-pressure filter. The high-pressure filter can act in conjunction with apparatus 100 or 300. During operation, an aqueous suspension of particles is obtained. The aqueous suspension of particles is processed through the high-pressure filter. The aqueous suspension can be directly introduced into the filter from the apparatus 100 or 300 to remove the liquid from the suspension resulting in the formation of a concentrated suspension of particles or a cake of particles. Alternatively, the cake of particles can be processed using freeze-drying or vacuum drying or other drying techniques to remove residual liquid in order obtain a dry powder.

In a preferred alternative embodiment of the invention, an emulsion source (e.g., the emulsion source described hereinabove) includes a device used to prepare an emulsion. That is, the emulsion components are maintained separate until just prior to use, and the emulsion is formed as needed. The emulsification device can be, for example, a Microfluidizer, ultrasonic horn, dispersator, colloid mill or a known commercially available equivalent commonly employed to prepare emulsions. Preferably, the emulsion is introduced into the extraction chamber immediately after formation. The current embodiment is particularly suited for the extraction of unstable emulsions, and for emulsions that are prepared with little or no surfactant or stabilizer.

In another embodiment of the invention, a plurality of extractors is arranged so that the extraction chambers are connected in series or in parallel. A parallel arrangement is particularly suited, for example, for large-scale manufacture of particles where the extraction, whereas the series arrangement allows extractions and particle production to be carried out in stages. With reference to both the parallel and the series arrangements, the processing conditions of each stage can also be varied as required. For example, a first extractor can be maintained at a particular pressure and temperature and can perform a contra-current extraction of an emulsion. The effluent from the first extractor can be flowed in series into a second extractor having a different pressure and temperature in the second extraction chamber, and the effluent can be processed using a co-current method according to the invention. Using the current embodiment, the extraction process can be carried out in stages. For example, the first extractor can be used to achieve partial removal of the solvent, and subsequent extractors can then be used to remove the remainder of the solvent.

In yet another embodiment of the invention, the extractor is a fractionation tower. Accordingly, materials can be removed from the extractor from differing advantageous locations along a length of the extractor, and the materials removed from differing locations may have differing properties. Examples of the differing properties can include, particle size, particle concentration, purity, ratio of solutes if multiple solutes are used, and the like.

With reference to other alternative embodiments, the emulsion is injected through a single-opening capillary nozzle into the extraction chamber. However, other known mixing methods are suitable for use with the present invention to facilitate contact of the emulsion with the extraction medium, increase mass transfer, and decrease processing time. The mixing methods include injection using twin-component or multi-component dispersion nozzles, in which an emulsion is co-introduced with supercritical fluid or other gaseous or liquid solvents to facilitate the dispersion process. Alternative nozzles that can be used to enhance mixing between the emulsion and the supercritical fluid include coaxial nozzles or ultrasonic nozzles. Improved contact between the emulsion and the supercritical fluid can also be achieved using a mixer (for example, a static mixer or a propeller mixer), a dispersator or a vibrating surface.

Additional alternative embodiments of the method include operating a liquid controlling valve that communicates a collection vessel (not shown) with the interior of the extractor 110. Preferably, the valve is a pneumatically controlled valve. The control valve controls the inflow of material into and out of the collection vessel and can act in communication with apparatus 100 or 300. The control valve (or valves if a plurality are used) can be switched to an open position to unblock access between the collection vessel and the interior of the extractor 110 and thereby allow the aqueous suspension of particles to flow from the interior of the extractor 110 into the collection vessel and to accumulate in the collection vessel. Subsequently the collection vessel can then be depressurized using the other control valve (exit side of the collection vessel) to retrieve the aqueous suspension. The opening and closing operation of each of the control valves can be continuously repeated in order to collect the product in a continuous manner.

EXAMPLES

The following examples are intended only to illustrate methods and embodiments in accordance with the invention, and as such should not be construed as imposing limitations upon the claims. Unless specified otherwise, the ingredients and the equipment is commercially available from such common chemical suppliers as Sigma Aldrich, Inc. (St. Louis, Mo.) and/or Fisher Scientific International, Inc. (Hanover Park, Ill.).

Example 1

Preparation of Poly(lactide)-glycolide (PLGA) Particles Via a Method According to the Invention Preparation of Poly(lactide)-glycolide (PLGA) Emulsion.

Ethyl Acetate (EA) was saturated with water to form a water-saturated EA solution. 20.0 grams of the saturated EA solution was measured. Into the 20.0 grams of ethyl acetate saturated solution was added 2.0 grams of Poly(lactide)-glycolide (PLGA). PLGA is commercially available from Birmingham Polymers, Inc. (Birmingham, Ala.) or Alkermes, Inc. (Cambridge, Mass.). The PLGA was dissolved into the saturated ethyl acetate solution to form a PLGA solution.

Distilled water was saturated with EA to form saturated aqueous solution. 180 g of EA saturated aqueous solution was measured. Polyvinyl alcohol (PVA) was dissolved into the portion of the ethyl acetate saturated aqueous solution at an amount of 0.5% by weight.

The PLGA solution was added into 180 grams of the EA saturated aqueous PVA solution to form a mixture. The mixture was dispersed or emulsified using a dispersator for 1–2 minutes at 2000 rpm. The resulting emulsion was then homogenized using a homogenizer or microfluidizer, commercially available from Microfluidics, Inc. (Newton, Mass.), at 12,000 p.s.i. in 2 passes. The resulting emulsion was then supplied to an emulsion pump.

Precipitation of PLGA Nanoparticles.

The apparatus 100 of the first embodiment was used to precipitate the particles. First, 200 milliliters (ml) of the emulsion of Example 1 were loaded or pumped by the emulsion pump 126 into the extractor 110. Simultaneously, the supercritical fluid pump 124 pumped supercritical $CO_2$ into the extraction chamber 140 through the frit 142 at the bottom of the extractor 110. The extraction chamber 140 was maintained at a constant pressure and temperature (80 bar and 45° Celsius, respectively) throughout the experiment. The flow rate of the supercritical $CO_2$ and the emulsion through the extraction chamber 140 was also maintained at a constant rate: 10 g/min $CO_2$ and 2 ml/min of emulsion. The supercritical $CO_2$ flowed upward through the packed bed 148 and contacted against the emulsion droplets 152 that flowed downward through the packed bed 148. The supercritical $CO_2$ dissolved the ethyl acetate from the droplets 152 and carried the ethyl acetate through the upper portion 150 and out of the chamber 140 through the regulator 132. The dissolution and loss of the ethyl acetate from the droplets 152 caused the PLGA to precipitate into fine particles suspended in the water phase of the droplet 152. The suspended particles and the water/surfactant mixture flowed downward into the liquid suspension phase 146.

An aqueous suspension of PLGA particles was obtained from the chamber 140 through the valve 130. The particles were then analyzed.

Analysis of PLGA Particles.

Figure 7:
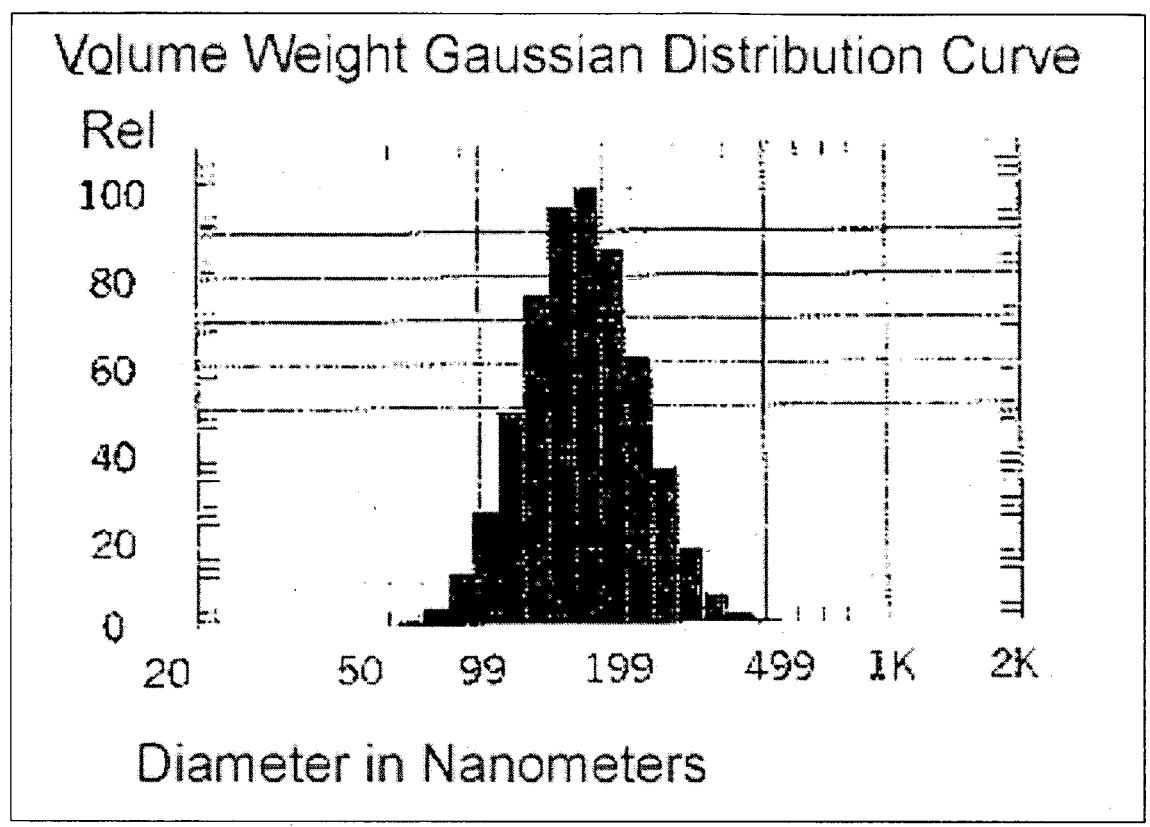
FIG. 7 is a volume size distribution graph of the PLGA particles produced in EXAMPLE 1.

Analysis of the aqueous colloidal suspension of PLGA particles was performed using a Scanning Electron Microscope (SEM) and DLS. From SEM micrographs, an example of which is shown in FIG. 6, it was determined that the PLGA particles were in the form of mono-dispersed spherical particles having a mean volume size of 188 nm. The results are listed in TABLE 3, below. FIG. 7 is a volume size distribution graph of the PLGA particles produced in EXAMPLE 1. The residual solvent content in the aqueous suspension was determined using gas chromatography (GC) and was found to be about 50 parts per million (ppm).

Example 2

Preparation of Poly(lactide)-glycolide (PLGA) Nanoparticles Via a Method According to the Invention, EXAMPLES 1–2 Show a Relationship Between Emulsion Droplet Size and Resultant Particle Size Preparation of PLGA Emulsion.

The emulsion was prepared in the same manner as in EXAMPLE 1, except that the final homogenization step was performed at 14,500 p.s.i. in 2 passes.

Precipitation of PLGA Nanoparticles.

The precipitation of PLGA particles was carried out in the same manner as in EXAMPLE 1.

Analysis of the PLGA Particles.

The PLGA particle in EXAMPLE 2 had a different size in comparison to the PLGA particles of EXAMPLE 1. The SEM micrographs show that the PLGA particles were spherical and mono-dispersed. PLGA particles having a mean volume size of 216 nm were obtained. The results of the number and volume distributions are listed in TABLE 3.

Example 3

Preparation of Cholesterol Acetate (CA) Particles Via a Method According to the Invention Preparation of Cholesterol Acetate (CA) Emulsion.

The emulsion was prepared in the same manner as in EXAMPLE 2, except that 1.0 gram of CA was used rather than 2.0 grams of PLGA. The emulsion is this case was emulsified using a dispersator instead of a homogenizer at 5000 rpm for 3 minutes.

Precipitation of CA Nanoparticles.

The precipitation of CA particles was carried out in the same manner as the precipitation method described in EXAMPLES 1 and 2.

Analysis of the CA Nanoparticles.

Analysis of the aqueous colloidal suspension of CA particles obtained from the EXAMPLE 3 was performed using the same SEM and DLS techniques as described above. The particle size is different than the PLGA particles of EXAMPLES 1 and 2 and is listed in TABLE 3. SEM micrographs showed mono-dispersed spherical particles.

Residual solvent content in the aqueous suspensions was determined using gas chromatography (GC), and was found to be <80 ppm.

Example 4

Preparation of Cholesterol Acetate (CA) Nanoparticles Via a Method According to the Invention, EXAMPLES 3–4 Show a Relationship Between Emulsion Droplet Size and Resultant Particle Size Preparation of CA Emulsion.

The emulsion was prepared in the same manner as in EXAMPLE 3, except that that the homogenization step was performed at 15,000 p.s.i. in 2 passes.

Precipitation of CA Nanoparticles.

The precipitation of CA particles was carried out in the same fashion as precipitation described in EXAMPLES 1 and 2.

Analysis of CA Nanoparticles.

Figure 8:
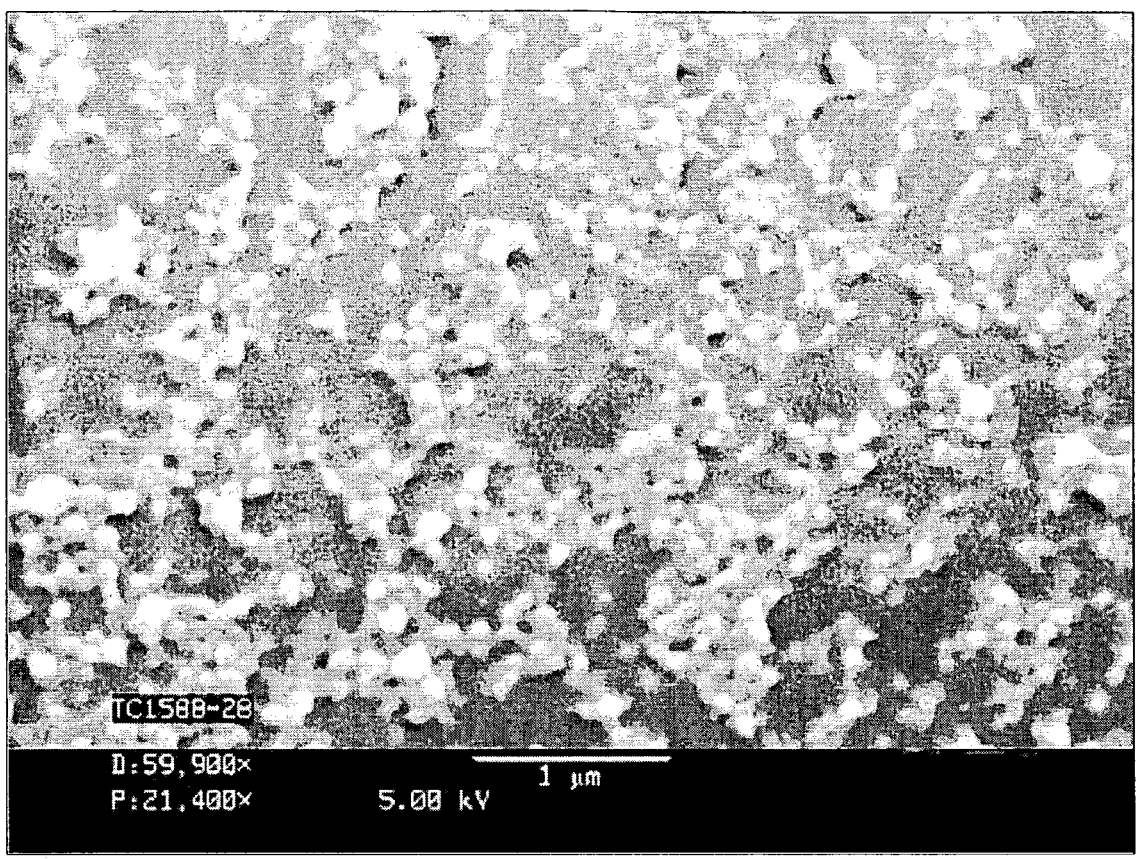
FIG. 8 is a SEM micrograph of CA particles produced in EXAMPLE 4 by a method according to the invention.
Figure 9:
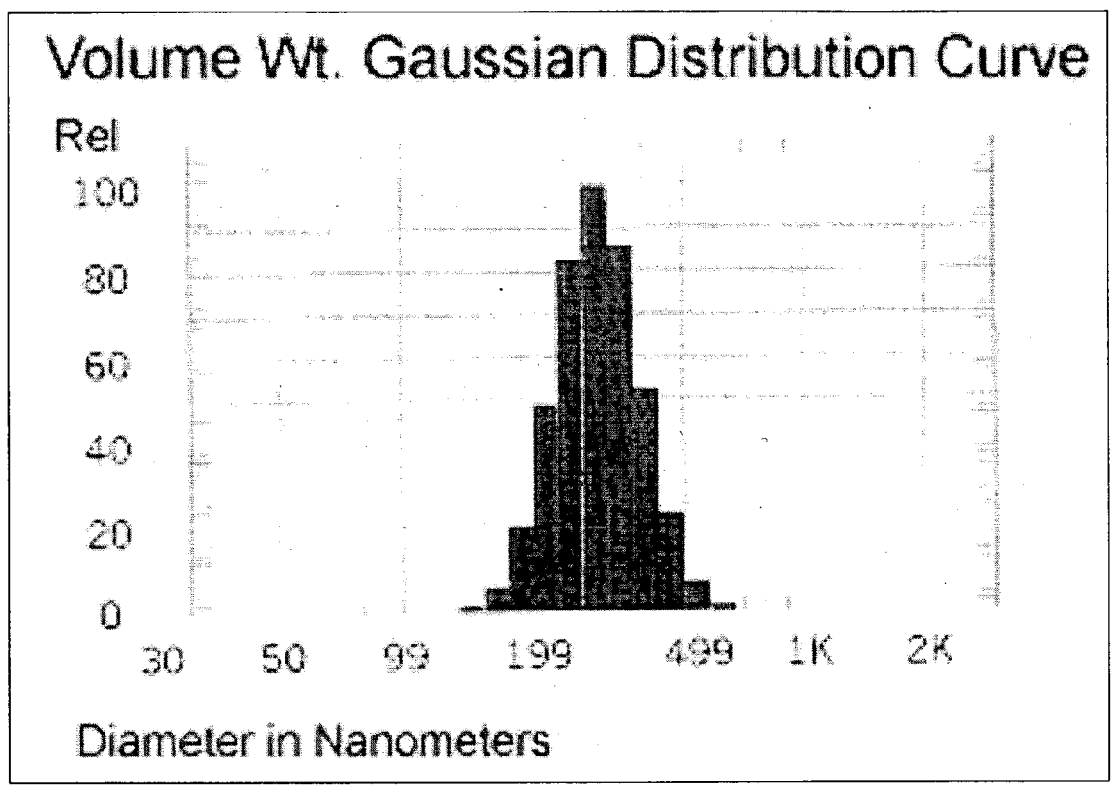
FIG. 9 is a volume size distribution graph of CA particles produced in EXAMPLE 4.

The CA particle in EXAMPLE 4 had a different size in comparison to the CA particles of EXAMPLE 3. The mean volume size of particles obtained in EXAMPLE 4 (315 nm) was smaller due to decreased droplet size of the emulsion used for extraction. The results are listed in TABLE 3. From SEM micrographs, an example of which is shown in FIG. 8, the CA particles are shown to be dispersed spherical particles. FIG. 9 is a volume size distribution curve of the CA particles produced in EXAMPLE 4.

Example 5

Preparation of Griseofulvin (GF) Particles Via a Method According to the Invention Preparation of Griseofulvin (GF) Emulsion.

The emulsion was prepared in the same manner as EXAMPLES 2 and 3, except that 0.42 grams of Griseofulvin (GF) was used rather PLGA or CA. Homogenization was carried out at 5 K psi (1 pass) and 17 K psi (3 Passes).

Precipitation of GF Nanoparticles.

The precipitation of GF particles was carried out in the same manner as described in EXAMPLE 1 except that CO2 flow rate was maintained at 20 g/min and the emulsion flow rate was maintained at 5 ml/min. The extraction column was maintained at 80 bar and 45° C.

Analysis of GF Nanoparticles.

Figure 10:
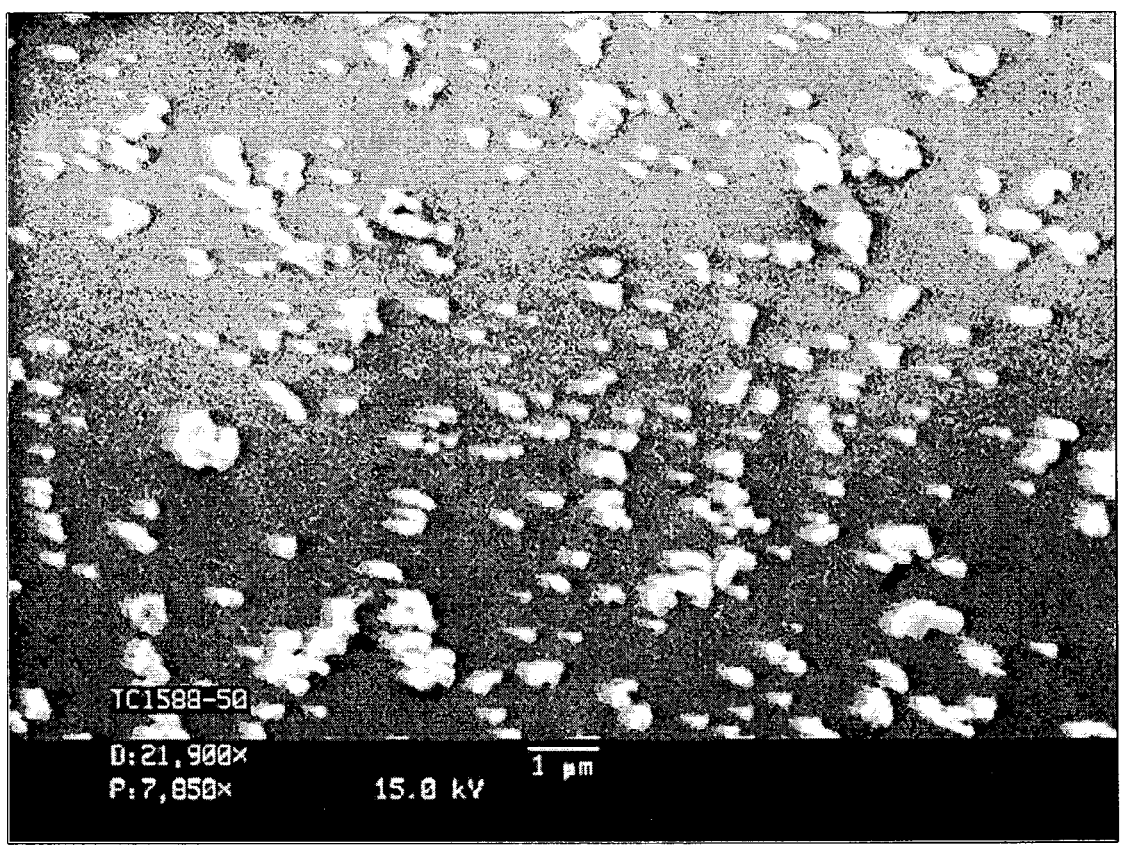
FIG. 10 is an SEM micrograph of GF particles produced in EXAMPLE 5 by a method according to the invention.
Figure 11:
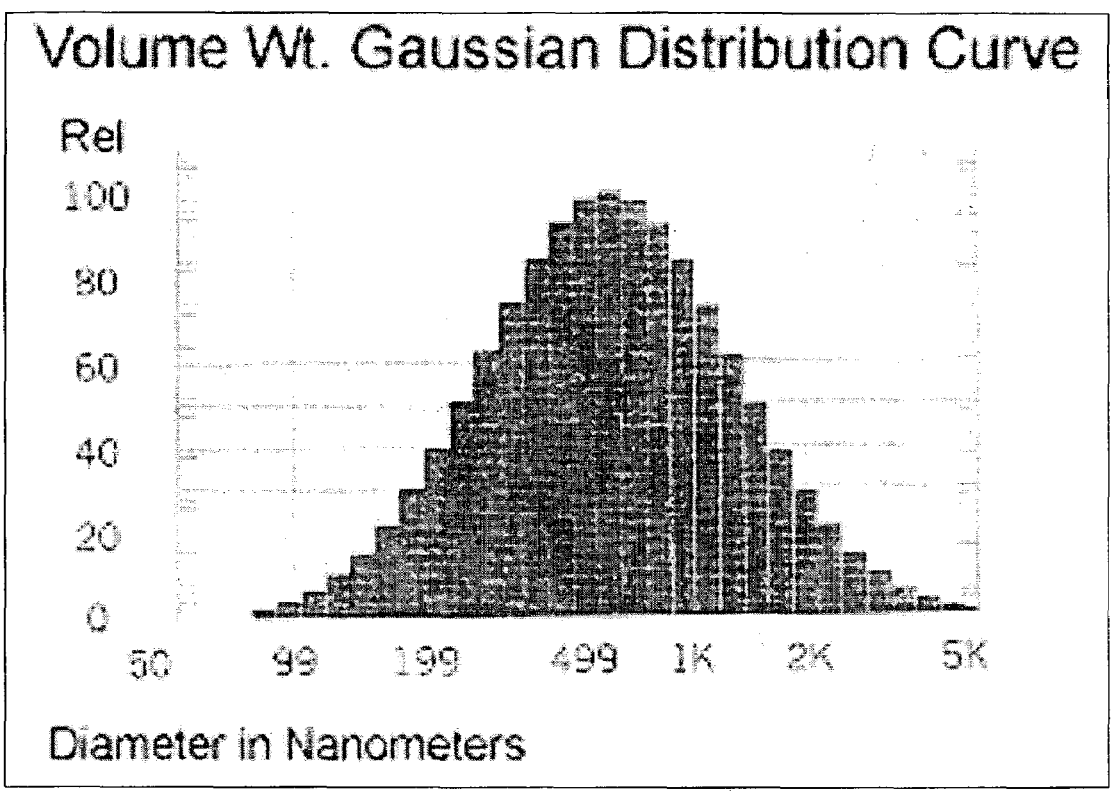
FIG. 11 is a volume size distribution graph of GF particles produced in EXAMPLE 5.

Analysis of the aqueous colloidal suspension of GF particles obtained from the above experiment was performed using a scanning electron microscope (SEM) and DLS. From SEM micrographs, an example of which is shown in FIG. 10, it was determined that the GF particles were in the form of mono-dispersed prismatic particles with a mean volume diameter of 853 nm with a standard deviation of 647 nm. More than 99.3% of the particles had a mean number average size of 306 nm with a standard deviation of 36 nm. The remainder of the particles (0.7%) had a mean size of 4.0 microns. FIG. 11 is a volume size distribution curve of GF particles produced in EXAMPLE 5. The curve has a rather broad slope. The variation in particle size is likely due to the emulsions used for GF precipitation, which were stable for only a short time period.

Example 6

Precipitation of Poly(lactide)-glycolide Encapsulated Indomethacin Nanoparticles Produced by a Method According to the Invention. EXAMPLE 6 Shows the Formation of Composite Particles Preparation of PLGA/IN Emulsions.

Emulsions prepared in EXAMPLE 6 were prepared in the same manner as EXAMPLE 5, except as mentioned below. 5.0 grams of Poly(lactide)-glycolide (PLGA) and 0.85 g of Indomethacin (IN) were added into 40.1 g of EA saturated solution. Once added, the PLGA and IN dissolved to form a solution. The solution was then added to 160 g of EA saturated aqueous solution of PVA (1% by weight) to form a mixture.

The mixture was divided into portions, which were homogenized using a Microfluidizer to form EMULSIONS 6(a)–6(c). Another portion of the mixture was homogenized using a Dispersator to form EMULSION 6(d). The droplet sizes were determined using DLS, and are listed in TABLE 1.

TABLE 1

Droplet sizes and homogenization conditions for EMULSIONS 6(a)–6(d).

| Emulsion Number | Homogenization conditions | Droplet size (nm) |
|---|---|---|
| 6(a) | 18000 psi (4 passes) | 312 |
| 6(b) | 7050 psi (4 passes) | 428 |
| 6(c) | 3525 psi (4 passes) | 703 |
| 6(d) | 4000 rpm for 2 min | 1887 |

Preparation of of PLGA/IN Nanoparticles

The precipitation of PLGA/IN particles was carried out in the same manner as in EXAMPLE 1. The pressure and temperature of the extraction column were 80 bar and 40° C., respectively. The $CO_2$ and the emulsion flow rates into the extraction chamber were maintained constant at 20 g/min and 1 ml/min, respectively. An aqueous colloidal suspension of IN encapsulated PLGA particles was obtained.

Analysis of PLGA/IN Nanoparticles

Figure 12:
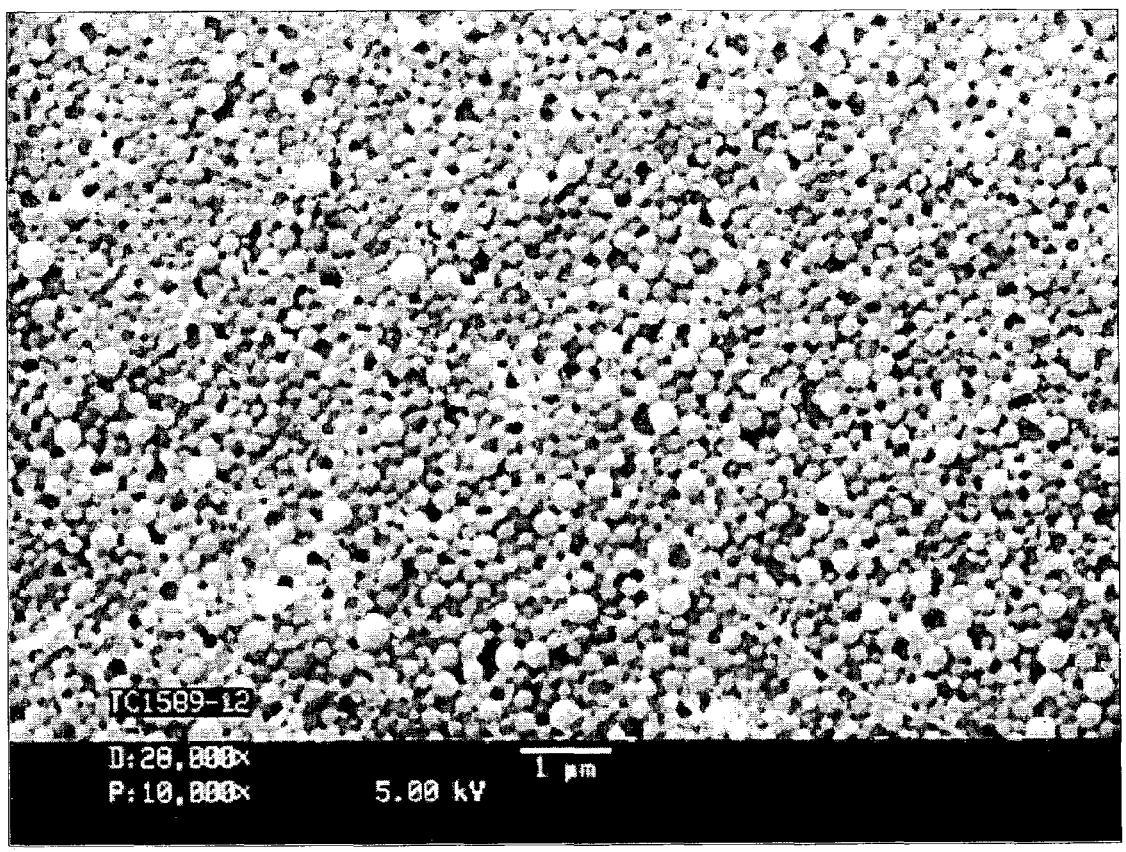
FIG. 12 is an SEM micrograph of PLGA/IN composite particles produced in EXAMPLE 6 by a method according to the invention.
Figure 13:
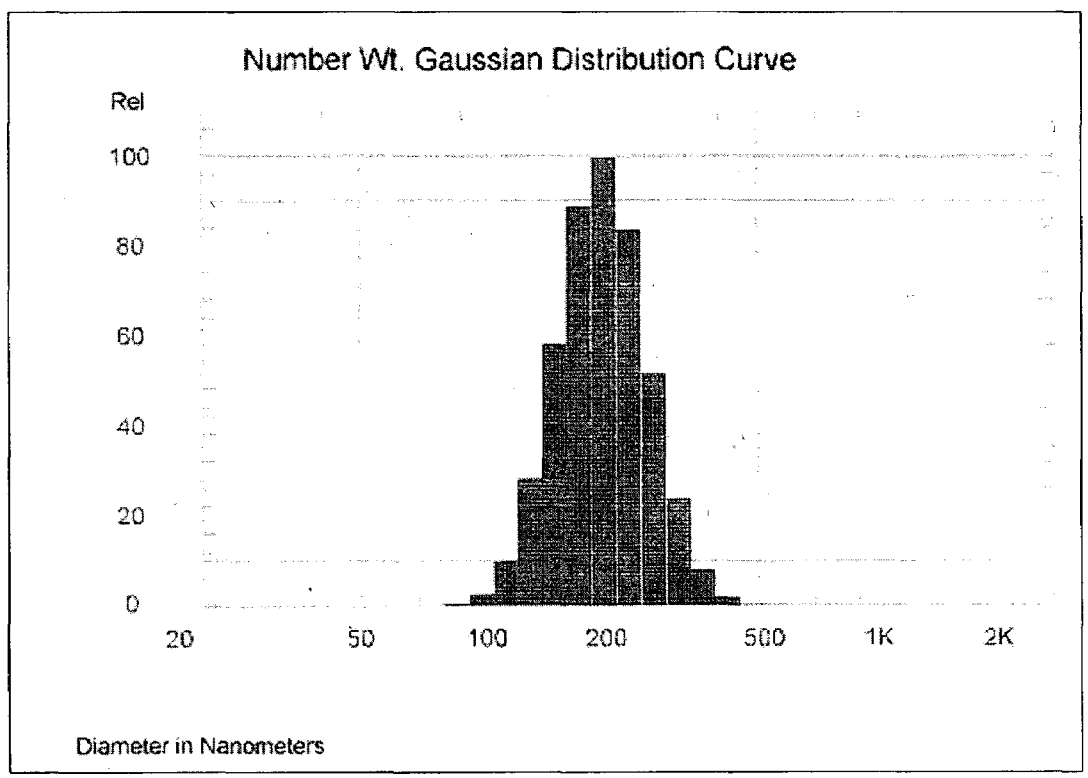
FIG. 13 is a number size distribution graph of PLGA/IN composite particles produced in EXAMPLE 6.
Figure 14:
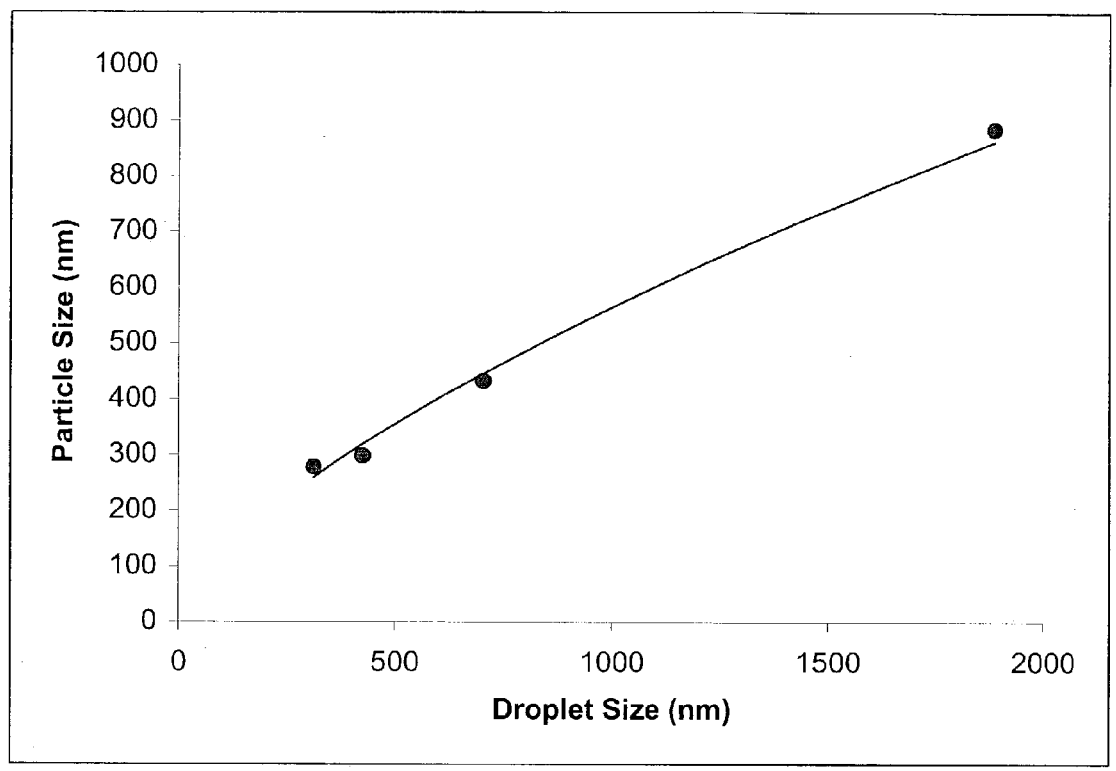
FIG. 14 is graph of PLGA/IN average particle sizes in nanometers (nm) versus emulsion droplet sizes (nm) for EXAMPLES 6(a)–6(d) produced by a method according to the invention.

Analysis of the aqueous colloidal suspension of IN encapsulated PLGA particles obtained from the EXAMPLE 3 was performed using the SEM and DLS techniques as described above. FIG. 12 is an SEM micrograph of particles obtained in EXAMPLE 6(a). Number average sizes of the particles obtained from each of the EMULSIONS 6(a)–6(d) have been shown in TABLE 2. FIG. 13 is a number size distribution curve of the PLGA/IN composite particles produced in EXAMPLE 6. As illustrated in FIG. 14 and TABLE 2 there is an increase in particle size with an increase in emulsion droplet size.

TABLE 2

Particle size with reference to emulsion droplet size for PLGA/IN composite nanoparticles.

| EXAMPLE | Droplet size (nm) | Particle size (nm) | Std. Dev. Particle size (nm) |
|---|---|---|---|
| 6(a) | 312 | 279 | 73 |
| 6(b) | 428 | 299 | |
| 6(c) | 703 | 434 | 254 |
| 6(d) | 1887 | 886 | 537 |

A summary of the particle sizes of the EXAMPLES 1–6 is shown in TABLE 3 for convenience of comparison.

TABLE 3

Results for EXAMPLES 1–6.

| EXAMPLE | MATERIAL | | VOLUME AVG. (nm) | NUMBER AVG. (nm) |
|---|---|---|---|---|
| 1 | PLGA | Value | 188 | 121 |
|   |      | Std. Dev. | 62 | 40 |
| 2 | PLGA | Value | 216 | 58 |
|   |      | Std. Dev. | 115 | 31 |
| 3 | Cholesterol Acetate | Value | 772 | 191 |
|   |      | Std. Dev. | 418 | 103 |
| 4 | Cholesterol Acetate | Value | 315 | 249 |
|   |      | Std. Dev. | 78 | 61 |
| 5 | Griseofulvin | Value | 853 | 306 (99.3%) |
|   |      | Std. Dev. | 647 | 36 |
| 6 | PLGA/ Indomethacin | Value | 279 | 210 |
|   |      | Std. Dev. | 73 | 55 |

The particles produced according to the present invention are controlled to have a generally uniform shape, homogeneity and size as desired. The processes involve the use of solutions and/or emulsions in a continuous particle production capacity. Accordingly, advantages of supercritical fluid processing of small particles can be combined with advantages of emulsion particle processing techniques in a continuous, rather than single batch, process.

The processes and embodiments described herein are examples of structures, systems and methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems and methods that do not differ from the literal language of the claims, and further includes other structures, systems and methods with insubstantial differences from the literal language of the claims.

What is claimed is:

1. A method for continuously producing particles, comprising the steps of:

flowing a supercritical fluid into an extraction chamber that is maintained at a temperature and a pressure sufficient to keep the supercritical fluid in a supercritical state;

flowing an emulsion into the extraction chamber simultaneous with the flow of supercritical fluid, the emulsion having a discontinuous phase comprising a first solvent that is soluble in the supercritical fluid, and a continuous phase comprising a second solvent that is less soluble in the supercritical fluid than the first solvent, the discontinuous phase further comprising a solute dissolved in the first solvent, whereby upon contacting the supercritical fluid the first solvent dissolves from the emulsion into the supercritical fluid causing the solute to precipitate as particles that become suspended in the second solvent;

flowing the first solvent-bearing supercritical fluid and the precipitated solute particles suspended in the second solvent out of the extraction chamber at the same rate as the emulsion and the supercritical fluid are flowing into the extraction chamber; and separating the suspension comprising the precipitated solute particles suspended in the second solvent from the first solvent-bearing supercritical fluid while maintaining the supercritical fluid in a supercritical state.

2. The method as defined in claim 1, further comprising the step of controlling the pressure or temperature in the extraction chamber to remain about constant.

3. The method as defined in claim 1, further comprising the step of filtering the suspension of precipitated solute particles suspended in the second solvent through a high-pressure filter to form a concentrated suspension or cake of solute particles, wherein the concentrated suspension or cake is suitable for drying.

4. The method as defined in claim 1, wherein the emulsion flows into the extraction chamber in a first direction, and the supercritical fluid flows into the extraction chamber in a second direction, wherein the second direction is the same as, opposite to, or orthogonal to the first direction.

5. The method as defined in claim 1, wherein the emulsion contacts the supercritical fluid along an interfacial boundary surface having a reduced surface area.

6. The method as defined in claim 5, wherein the separating step comprises providing a separation vessel, flowing the first solvent-bearing supercritical fluid and the suspension of precipitated solute particles suspended in the second solvent out of the extraction chamber into the separation vessel, skimming the first solvent-bearing supercritical fluid from a first volume of the separation vessel, and decanting the suspension of precipitated solute particles suspended in the second solvent from a second volume of the separation vessel that is spaced from the first volume.

7. The method as defined in claim 1 wherein the first solvent is a non-polar solvent or partially water soluble organic solvent.

8. The method as defined in claim 1 wherein the second solvent is water or is water-soluble.

9. The method as defined in claim 1 wherein the particles have an average diameter of from about 0.1 nanometers to about 1.0 millimeter.

10. The method as defined in claim 9 wherein the particles have an average diameter of from about 0.1 micrometers to about 400 micrometers.

11. The method as defined in claim 1 further comprising the step of selecting a concentration of the solute in the first solvent to obtain a desired particle size, wherein an increase in the solute concentration results in an increase in the particle size, and a decrease the solute concentration results in a decrease in the particle size.

12. The method as defined in claim 1 further comprising the step of selecting a concentration of the discontinuous phase in the continuous phase to obtain a desired particle size, wherein an increase in the concentration of the of the discontinuous phase results in an increase in the particle size, and a decrease the concentration of the of the discontinuous phase results in a decrease in the particle size.

13. The method as defined in claim 1 wherein the emulsion flows into contact with the supercritical fluid in the extraction chamber in the form of droplets, and wherein after the first solvent dissolves from the droplets of emulsion into the supercritical fluid the solute particles are precipitated into and suspended in droplets of the second solvent.

14. The method as defined in claim 13 further comprising the step of selecting a droplet size of the emulsion to obtain a desired particle size, wherein an increase in the droplet size results in an increase in the particle size, and a decrease the droplet size results in a decrease in the particle size.

15. The method as defined in claim 13 wherein the emulsion is injected through a nozzle such that the emulsion is sprayed into a volume of the supercritical fluid in the form of droplets, and the nozzle is a capillary nozzle, a coaxial nozzle or an ultrasonic nozzle.

16. The method defined in claim 13 wherein a mixer is disposed within the extraction chamber to increase the contact area between the emulsion droplets and the supercritical fluid, the mixer being a vibrating surface or a propeller mixer or a static mixer, and thereby increasing a mass transfer rate of the solvent from the emulsion droplets to the supercritical fluid.

17. The method as defined in claim 1 further comprising the step of forming the emulsion using a microfluidizer, an ultrasonic horn, a dispersator, a static mixer, a colloid mill, a fluid energy mill, a turbine mixer, or a spontaneous emulsification technique.

18. The method as defined in claim 1 wherein the solute is selected from the group consisting of biologically active materials, medicinal agents, nutritional materials, proteins, peptides, alkaloids, alkyloids, animal and/or plant extracts, antigens, nucleic acids, antibiotics, vitamins, lipids, polymers, polymer precursors, pigments, toxins, insecticides, viral materials, diagnostic aids, agricultural chemicals, dyes, explosives, paints, cosmetics, enzymes, and catalysts.

* * * * *